United States Patent [19]

Schmadel et al.

[11] Patent Number: 4,468,091
[45] Date of Patent: Aug. 28, 1984

[54] FIBER OPTIC ENERGY SENSOR AND DEMODULATION SYSTEM AND METHOD OF MAKING SAME

[75] Inventors: Donald Schmadel; William H. Culver; Gordon Gould, all of Gaithersburg, Md.

[73] Assignee: Optelecom, Incorporated, Gaithersburg, Md.

[21] Appl. No.: 402,578

[22] Filed: Jul. 28, 1982

Related U.S. Application Data

[62] Division of Ser. No. 132,274, Mar. 20, 1980, Pat. No. 4,360,272.

[51] Int. Cl.³ ............................................. G02B 5/172
[52] U.S. Cl. .............................. 350/96.30; 350/96.15; 350/96.29
[58] Field of Search ............... 350/96.15, 96.29, 96.30, 350/96.31, 96.33, 96.34

[56] References Cited

U.S. PATENT DOCUMENTS

| 4,235,113 | 11/1980 | Carome | 367/140 |
|---|---|---|---|
| 4,264,126 | 4/1981 | Sheem | 350/96.15 |
| 4,268,116 | 5/1981 | Schmadel, et al. | 350/96.29 |
| 4,315,666 | 2/1982 | Hicks, Jr. | 350/96.15 |
| 4,354,735 | 10/1982 | Stowe, et al. | 350/96.29 |

FOREIGN PATENT DOCUMENTS

| 53-37438 | 4/1978 | Japan | 350/96.15 |
|---|---|---|---|
| 53-68249 | 6/1978 | Japan | 350/96.15 |

OTHER PUBLICATIONS

Sheem et al., "Acoustic Sensitivity of Single-Mode Optical Power Dividers", *Optics Lett.*, vol. 4, No. 10, Oct. 1979, pp. 322–324.

Hocker, "Fiber Optic Acoustic Sensors with Composite Structure...", *Appl. Optics*, vol. 18, No. 21, Nov. 1979, pp. 3679–3683.

*Primary Examiner*—John D. Lee
*Attorney, Agent, or Firm*—Kerkam, Stowell, Kondracki & Clarke

[57] ABSTRACT

A fiber optic energy sensor and optical demodulation system is disclosed wherein the signal energy to be sensed or detected causes an etched single mode fiber to be stretched or compressed which causes the optical path length for electro-magnetic radiation traveling in the core of the optic fiber to change. The change in optic path length modulates the electro-magnetic radiation traveling in the fiber. There is also disclosed novel methods of manufacturing the novel type of fiber optic energy sensor and optical demodulation system.

4 Claims, 18 Drawing Figures

FIBER OPTIC ENERGY SENSOR AND DEMODULATION SYSTEM AND METHOD OF MAKING SAME

This application is a division of application Ser. No. 132,274, filed Mar. 20, 1980 now U.S. Pat. No. 4,360,272 dated Nov. 23, 1982.

DESCRIPTION

1. Technical Field

The invention relates to the field of radiant energy modulation in optical fibers.

2. Background of Prior Art

The prior art for either phase modulation or frequency modulation of, for example, light in an optical fiber, utilized the acousto-optic effect wherein the signal to be imposed onto the light carried in the fiber is used to mechanically or acoustically excite the fiber. This mechanical or acoustical excitation gives rise to a variation in the optical index of the core of the fiber. The result is a variation in the optical path length for the light traveling in the fiber. This light is therefore modulated in phase and frequency by the signal. For glass fibers the change in optical index is quite small for a given energy of mechanical or acoustical excitation. In order to obtain sufficient modulation, this necessitates either high signal energy or long interaction lengths where the interaction length is the length of fiber which must be acoustically excited wherein modulation occurs. The sensitivity of optical fibers to direct acoustical modulation is discussed by J. A. Bucaro in Applied Optics; Vol. 18; No. 6; Mar. 15, 1979.

The invention constructs single mode fiber which has reduced clad thickness for use in sensors which allow signal energy to stretch single mode fibers to cause phase modulation. The invention also constructs low order mode optical fibers from large diameter optical fibers. The invention accomplishes these two efforts by etching presently available optical fibers.

As discussed in "Acoustic Sensitivity of Single Mode Optical Power Dividers", by S. K. Sheem and J. H. Cole in *Optics Letters*, Vol. 4; No. 10; October, 1979, the prior art etches single mode fiber in order to decrease its light guiding capabilities without any regard to its increased or decreased acoustic sensitivity or change in mode structure. Such an effect, decreased light guiding capability, is considered detrimental to the invention's purpose and the invention specifically provides means to minimize it.

This invention also uses length limited distributed wavelength reflectors to reflect light within a single mode optical fiber. Such reflection is discussed in U.S. patent application Ser. No. 088,579, entitled METHOD AND APPARATUS FOR RADIANT ENERGY MODULATION IN OPTICAL FIBERS (now U.S. Pat. No. 4,268,116), and in "Photosensitivity in Optical Fiber Waveguides: Application to Reflection Filter Fabrication" by K. O. Hill et al in *Applied Physics letters*, 32(10), May 15, 1978.

The invention also uses reflectors which cause reflection within an optical fiber in an arrangement which resembles a Fabry-Perot interferometer. Such an arrangement is discussed in "Fiber Optic Hydrophone:- 'Improved Strain Configuration and Environmental Noise Protection" by P. G. Cielo in *Applied Optics*, Vol. 18, No. 17; Sept. 1, 1979. The invention provides a novel detection system which uses this arrangement of reflectors as one of its many components.

BRIEF SUMMARY OF INVENTION

The invention comprises a novel type of fiber optic energy sensor, a method of manufacturing such type, and an optical demodulation system which can be used to convert the output of this type of energy sensor as well as other types of energy sensors into a more easily handled electronic signal.

The invention uses etched single mode fiber for the energy sensor. The energy sensor operates as follows:

The signal energy to be sensed or detected is caused to stretch an etched single mode fiber. An etched single mode fiber is a single mode glass clad fiber whose cladding thickness has been reduced a specific amount so as to lower its strength. The invention provides that, when necessary to maintain the etched single mode fiber's light guiding properties, the portion of the glass clad which was removed is replaced with a plastic material whose optical index is lower than that of the single mode fiber's core material and whose elastic modulus is lower than that of the glass clad which it replaces. Such an etched single mode fiber is more sensitive to stretching or compression because it is weaker. For a given amount of signal energy, a single mode fiber will stretch a greater amount after it has been etched.

The prior art teaches that stretching a length of single mode fiber causes the optical path length for electromagnetic radiation traveling in its core to change. The art further teaches that this change in optical path length increases as the amount which the single mode fiber is stretched increases. The prior art uses this change in optical path length to modulate the electromagnetic radiation traveling in the core of the fiber. The prior art also teaches that the amount of modulation increases as the optical path length change increases in magnitude. Therefore, a fiber optic energy sensor constructed with etched single mode fiber and operating by longitudinally stretching or compressing the etched single mode fiber will for a given amount of signal energy produce greater modulation which results in greater sensitivity.

The invention also uses the etching process to produce optical fibers with low modal dispersion from optical fibers having larger diameters.

The invention also provides a manufacturing process to construct devices using etched optical fiber. This process cuases a form to be constructed of materials which will not affect the etching process. These forms are used to maintain the fiber to be etched in the same configuration as it is to be in the actual device. Various means are also detailed which permit the form to be removed if it is to be absent in the actual device.

Finally, the invention provides an optical demodulation system which renders energy sensors more useful by actually optically demodulating the output of the energy sensor, thus substantially reducing the previously enormous bandwidths required of the electronic demodulation equipment. The optical demodulation system presented also allows for multiplexing several energy sensors onto the same optical fiber, thus substantially reducing costs for a multi-sensor system such as a hydrophone array.

The optical demodulation system locates each energy sensor between the members of a pair of length limited Bragg reflectors formed inside of the optical fiber. Each pair of reflectors as arranged, forms a Fabry-Perot type interferometer which only contains resonances for those portions of the electro-magnetic spectrum in which the Bragg reflectors operate. Since each energy sensor is located between the reflectors of a pair, then as signal energy is detected the sensor's resulting optical path length change causes the resonances of the Fabry-Perot interferometer to shift spectrally. The system then partially demodulates this spectral shift using a second Fabry-Perot interferometer, called the analyzer interferometer, whose resonances have a spectral separation relative to that of the interferometer containing the energy sensor so as to cause amplification of the spectral shift. The output of the combination of the energy sensor interferometer and the analyzer interferometer shifts spectrally more than the original spectral shift by an amplification factor given by equations presented in the detailed description of the invention. The system also allows the use of more than one analyzer interferometer, each causing different amplification. The resulting amplifications can be arranged to provide outputs each of which corresponds to a separate digit of the number expressing the original spectral shift thus reducing the bandwidth of the electronic detectors and time demodulator.

The optical demodulation system finally allows for multiplexing several energy sensors onto the same fiber by causing each reflector pair corresponding to each sensor to have different reflection bands from all other reflector pairs.

The system uses a wavelength scanning laser, the output of which scans over the resonances of one reflector pair at a time.

DETAILED DESCRIPTION OF THE INVENTION

The invention comprises a highly sensitive fiber optic, energy sensor and an optical demodulation system which can convert the output of the energy sensor to an electric analog signal. First the energy sensor will be discussed and second the demodulation system will be discussed.

The present art of fiber optic energy sensors teaches that if a single mode optical fiber is compressed radially, or stretched, or compressed longitudinally, then the optical path length for electro-magnetic radiation traveling in the core of the single mode optical fiber changes. The art further teaches that as the amount which the single mode fiber is stretched or compressed increases, then the change in the optical path length also increases. The present art uses this change in optical path length to cause phase modulation of the light traveling in the core. The length of optical fiber in which modulation occurs is called the interaction length.

The invention provides etched single mode fiber for use in fiber optic, energy sensors. Single mode fiber is a fiber constructed so as to allow only the lowest order mode to propagate. This lowest order mode for some single mode fiber constructions is two fold degenerate. In these cases, the lowest order mode contains two states of propagation which are distinguished by the fact that their polarizations are mutually perpendicular.

Etched single mode fiber is defined herein as single mode optical fiber whose clad thickness has been reduced by a chemical reaction (e.g., etching in a bath of hydrofluoric acid or a bath of hydrofluoric acid buffered with ammonium fluoride), or ion milling.

Figure 1:
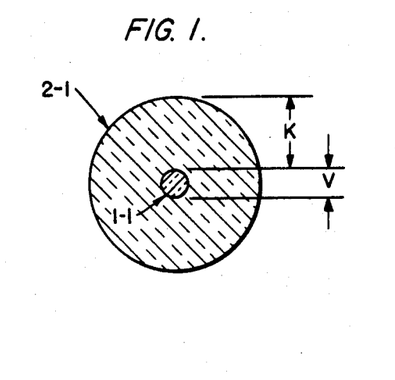
FIG. 1 is a cross sectional view of a single mode optical fiber greatly magnified.
Figure 2:
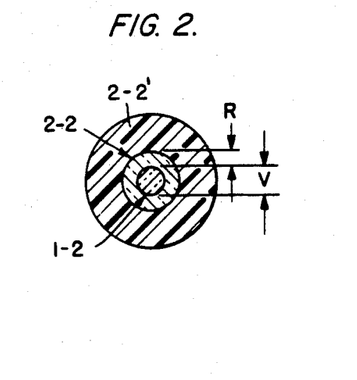
FIG. 2 is a greatly magnified, cross sectional view of the single mode optical fiber of FIG. 1, which has been etched in accordance with the invention.

FIG. 1 is a magnified cross sectional view of a fiber prior to etching. FIG. 2 is a magnified cross sectional view of the fiber after etching. In FIG. 1, the glass clad generally designated as 2-1, is shown to have a thickness designated K. In FIG. 2, the clad 2-2 is shown to have a reduced thickness designated as R. In both FIGS. 1 and 2, the core designated as 1-1 and 1-2 has a diameter V which remains unchanged by the nature of the etching process, which occurs only at the exposed surface of the fiber.

The utility of such a fiber is explained first in terms of sensitivity followed by an explanation of the ease of manufacture of devices employing etched single mode fibers. For a given amount of signal energy, E, to be detected, the fiber of length L and total cross sectional area $S_1$, where $$S_1 = \left(\frac{K + K + V}{2}\right)^2 \pi,$$

of FIG. 1, will stretch an amount $\Delta L_1$ as below:

$$\Delta L_1 \approx \sqrt{\frac{2LE}{S_1 Y_o}} \qquad \text{EQ I}$$

where $Y_o$ is the modulus of elasticity of the fiber material and for the explanation may be assumed constant and equal to that of fused quartz. Using the same derivation above, but substituting the reduced cladding thickness into EQ 1 gives the amount of stretch $\Delta L_2$, which the etched fiber will undergo for the same given amount of signal energy E, $$\Delta L_2 \approx \sqrt{\frac{2LE}{S_2 Y_o}} \qquad \text{EQ II}$$

where $S_2$ $$S_2 = \left(\frac{R + R + V}{2}\right)^2 \pi$$

and is the cross sectional area of the etched fiber. Since $S_1$ is greater than $S_2$ then from EQ 1 and II, $\Delta L_2 > \Delta L_1$. The present art of fiber optic sensing teaches therefore, that for a given amount of signal energy the etched single mode fiber will have a greater change in optical path length than the normal single mode fiber, resulting in a greater amount of phase modulation of light traveling in the core.

Further utility can be understood realizing that fibers having very small overall diameters are difficult to construct using present methods and even if constructed, are difficult to handle. Through the teachings of this invention, devices which might use fibers with reduced clad thickness can be constructed with readily available larger diameter fibers. When such devices are assembled to the point where the larger fiber is in place, the fiber can then be etched, thereby eliminating further handling of a thin fiber or a fiber with a reduced clad. A more detailed explanation of this process follows later.

Figure 3:
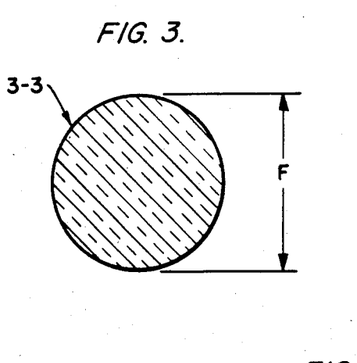
FIG. 3 is a greatly magnified cross sectional view of a large diameter fiber of core material.

Further utility can be recognized when the need to construct fibers with small core diameters arises, and the invention allows such fibers to be constructed from larger diameter fibers. FIG. 3 shows the cross section of a large diameter optical fiber, 3-3, which is a core material, (e.g., silica glass), of diameter F. The large diameter fiber is etched thus producing the thin fiber whose cross section is shown as 4-4 in FIG. 4, having a reduced diameter G. The invention further provides that fiber having a diameter G can then be coated with a material 5-4 having a lower index of refraction, such as RTV 670 silicone rubber produced by General Electric Corp., than the fiber itself thus producing an optical fiber with a small core diameter. Such a small core diameter fiber is useful for having a low number of guided optical modes.

Figure 4:
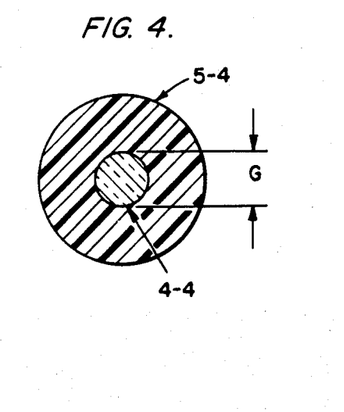
FIG. 4 is a greatly magnified cross sectional view of the large diameter fiber of FIG. 3 after having been etched and coated in accordance with the invention.

As an example of the etching process, the fiber 3-3, FIG. 3, may have a pre-etching diameter in the range of 100 μm and the etched core 4-4, FIG. 4, may have a diameter in the range of 50 μm to 5 μm.

Figure 5:
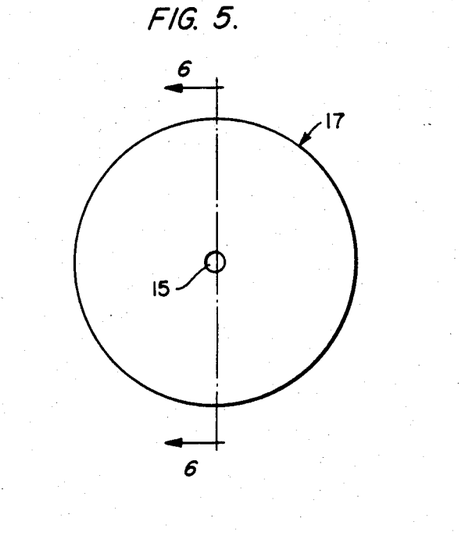
FIG. 5 is an end view of an acoustic energy sensor shown in FIG. 6.
Figure 6:
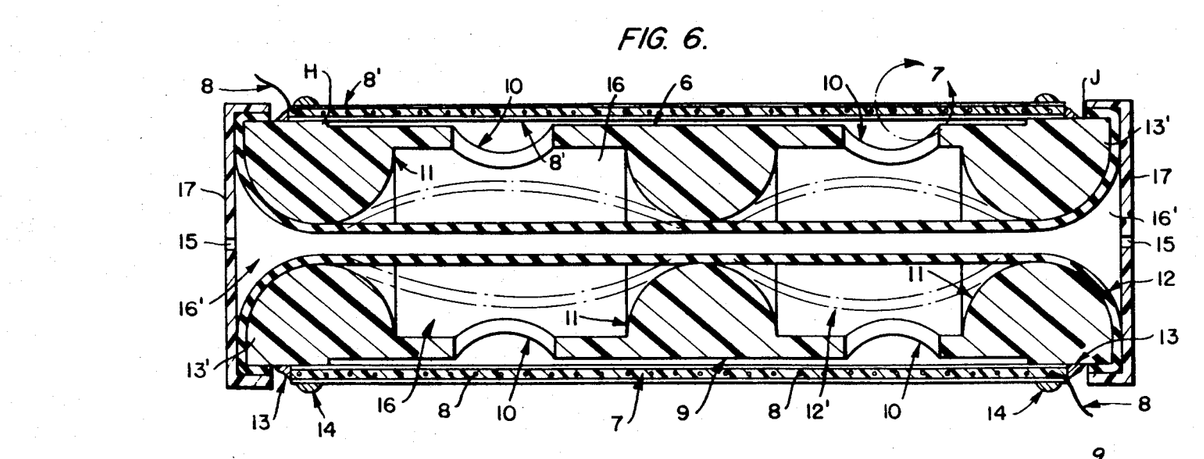
FIG. 6 is a cross sectional illustration on line 6—6 of the acoustic energy sensor of FIG. 5.
Figures 7, 8, 9:
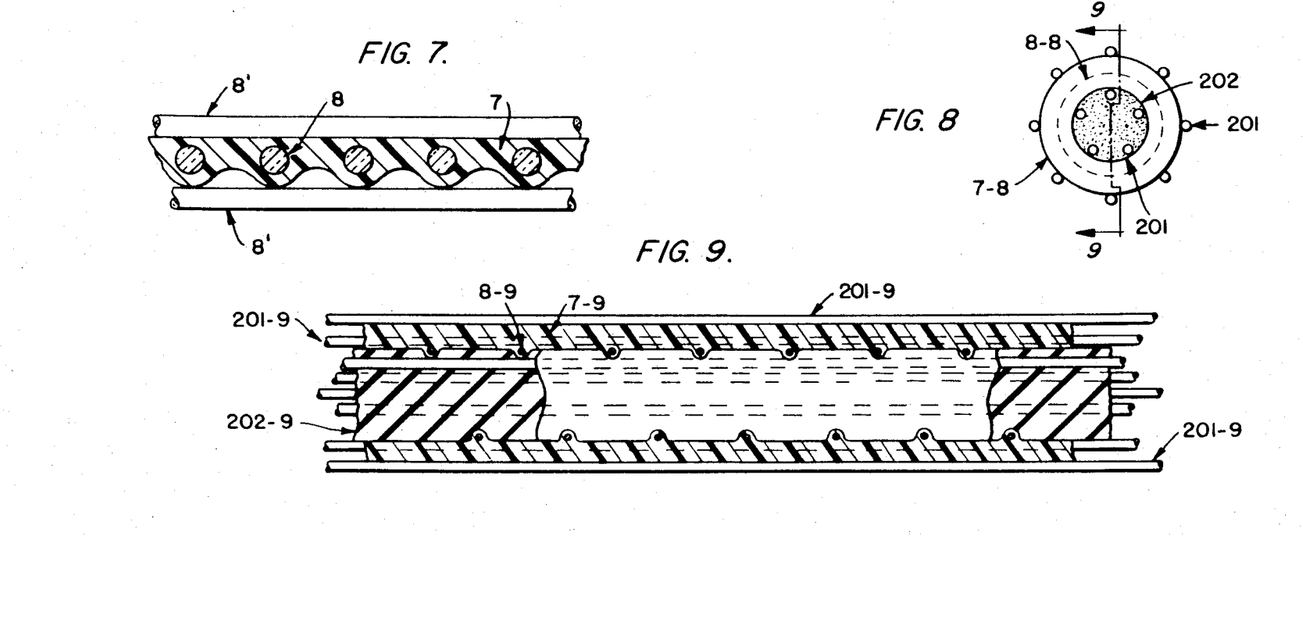
FIG. 7 is an enlarged partial illustration of the acoustic energy sensor of FIGS. 5 and 6.
FIG. 8 is an end view of another acoustic energy sensor provided by the invention.
FIG. 9 is a cross section on line 9—9 of the acoustic energy sensor of FIG. 8.

The invention provides the particular hydro-acoustic energy sensor shown in FIGS. 5 and 6, and in part, in FIG. 7. FIG. 5 is an end view of the sensor illustrating its cylindrical shape. FIG. 6 is a sectional view of the sensor. This sensor consists of a rigid cylindrical skeleton, perhaps made of aluminum, designated 6 in FIG. 6.

The outside surface of this cylindrical skeleton has a reduced diameter between planes H and J. About this cylindrical skeleton is a membrane of compliant material generally designated 7, in which are radial turns of single mode optical fiber generally designated as 8. Such a compliant material may be, for example, silicone rubber or PVC. This sleeve is cemented as at 13 and/or clamped as at 14, to the larger diameter ends 13' of the cylindrical skeleton, thus creating a space 9 between the compliant membrane and the rigid cylindrical skeleton where the diameter of the rigid form is reduced. In the wall of this rigid cylindrical skeleton where the diameter is reduced are equalization holes 10 which extend from the inside wall of the cylindrical skeleton to the space between the compliant membrane and the rigid skeleton. On the inside walls of the cylindrical skeleton are protrusions designated as 11 in FIG. 6. Also, inside the cylindrical skeleton is stretched a compliant bladder 12 which serves as ballast supply and creates a reservoir 16, which communicates with space 9 by holes 10. The spaces 16 and 9 are filled with a second viscous compliant material, such as air, $H_e$, or a silicone oil. There is also provided end caps 17 which create an additional space 16' shown in FIG. 6, and which are provided with holes 15, which extend through the thickness of each of the end caps. The hydrophone shown in FIGS. 5, 6, and 7 operates as follows:

The hydrophone is immersed in the fluid containing the acoustical waves to be measured. At any particular depth the invention causes the static pressure in the spaces 9 and 16 to be equalized with the static pressure in the fluid exterior to the hydrophone by allowing some of this fluid to enter the hydrophone through holes 15 and then to stretch bladder 12 around the protrusions 11, as illustrated by the dashed lines labeled 12', thus compressing the second viscous compliant material in spaces 16 and 9. When the pressure in spaces 16 and 9, plus the additional pressure generated in stretching the bladder 12 is equal to the exterior pressure, the fluid stops flowing through holes 15. The holes 15 and/or the equalization holes 10 are sufficiently small so as to slow the rate of equalization to time periods much longer than the time periods between the acoustic pressures to be measured.

The acoustic signals to be measured or sensed by the hydrophone consist of alternating changes in the surrounding fluid pressure. Because these changes are not equalized by the above bladder mechanism, they instead cause the compliant membrane 7 to expand and contract radially, thus longitudinally stretching and compressing the etched single mode fiber 8.

For those applications which require the hydro-acoustic sensor of FIGS. 5, 6 and 7 to be in motion while it is being used to sense hydro-acoustic signals, the invention provides strength strands, for example, fibers 8' in FIGS. 6 and 7, attached parallel to the axis of the rigid cylinder 6. The fibers 8' are cemented to the outside and/or inside surface of the compliant membrane 7 and extend under each clamping ring 14 about the rigid cylinder 6. The clamping surfaces are the portions 13' of the rigid cylinder to which the compliant membrane 7 is attached. Such strength fibers 8' may be of Kevlar, a tire-cord fiber made by DuPont, or glass. Such strength fibers 8' are placed to increase the longitudinal strength of the compliant membrane 7. Therefore, if the hydro-acoustic sensor of FIGS. 5, 6 and 7 should be accelerated in the direction of the axis of the rigid cylinder 6 then the resulting deformation of the compliant membrane 7 will have been lessened by the strength fibers 8' in FIGS. 6 and 7. Further, the strength fibers 8' when placed parallel to the axis of the rigid cylinder 6 will not substantially increase the resistance of the compliant membrane to radial contraction as caused by the acoustic signals to be sensed. Further, the mass of the compliant membrane may be varied as well as the density of the single mode fiber turns 8 which will have the affect of shifting its hydro-acoustic frequency response.

The invention also provides the hydro-acoustic sensor of FIGS. 8 and 9. FIG. 8 is an end view of the hydro-acoustic sensor and FIG. 9 is a cross sectional view of the sensor of FIG. 8 wherein 7-9 designates a compliant membrane within which is a helix of single mode fiber 8-9. The assembly also includes an inner cylinder 202 of resilient compliant material such as silicone rubber, which is in contact with the inside wall of the compliant membrane 7-9. Strength strands, for example, fibers 201 are located parallel to the axis of the compliant membrane 7-9 and are in mechanical contact with the inner cylinder material 202 so as to increase the longitudinal strength of the inner cylinder without significantly modifying its radial compliance. The strength fibers 201 may be made of Kevlar or glass and may also be continued in length beyond the ends of the compliant material and then may be used to anchor the sensor in place. The inner compliant cylinder 202 may also be continued in length to aid in positioning or anchoring the sensor. The invention also provides that the strength fibers 201 be mechanically attached to the outside of the compliant membrane 7-9 parallel to the axis of membrane 7-9 to increase its longitudinal strength. Increasing the longitudinal strength of the sensor not only increases sensor durability but also reduces the amount of radial expansion and contraction which results from longitudinal acceleration of the sensor, without reducing its response, i.e., radial expansion and contraction, to acoustic signals.

The hydro-acoustic sensor of FIGS. 8 and 9 operates as follows: The sensor is immersed in the solution containing the acoustic signals. The periodic alternations of pressure present in an acoustic signal cause the compliant membrane 7-9 to expand and contract. As the membrane 7-9 expands and contracts, it stretches or compresses the etched single mode optical fiber 8-9, thus, as previously set forth, modulating the electro-magnetic radiation traveling inside the core of the fiber 8-9. Further, since the inner cylinder is also radially compliant it will offer less resistance to the expansion and contraction of the compliant membrane. The invention provides that the sensor of FIGS. 8 and 9 may use etched single mode fiber for the single mode fiber 8-9.

The etched single mode fiber of the invention has utility in all energy sensors, which use a signal energy to longitudinally stretch or compress a single mode fiber to cause a change in the fibers optical path length. Some energy sensors may employ low order mode optical fiber when the modal dispersion of such fibers is low enough to maintain sufficient optical coherence throughout the interaction length. For these energy sensors the invention supplies the thin fiber of FIG. 4. It is to be noted that any optical fiber can be etched to increase its sensitivity to longitudinal stretching and compression, such as multimode step index or graded index fibers.

In cases wherein the glass cladding of step index or graded index fiber is removed by etching so as to impair its electro-magnetic radiation guiding abilities, the invention provides that the resulting fiber may be coated with a material as at 2-2' FIG. 2 of the drawing, having an optical index lower than the fiber core such as RTV 670 silicone rubber to restore its ability to guide electromagnetic radiation. Therefore, the invention includes in its scope "etched optical fiber" as well as "etched single mode optical fiber" and throughout the specification and claims these terms can be interchanged whenever etched fiber has low enough modal dispersion to sufficiently maintain optical coherence for proper operation of the device and when the purpose of using etched optical fibers is to increase sensitivity to longitudinal stretching or compression, or when the purpose is to provide a low order mode fiber, i.e., one with low modal dispersion, or for both of these purposes simultaneously.

Manufacturing

Figure 10:
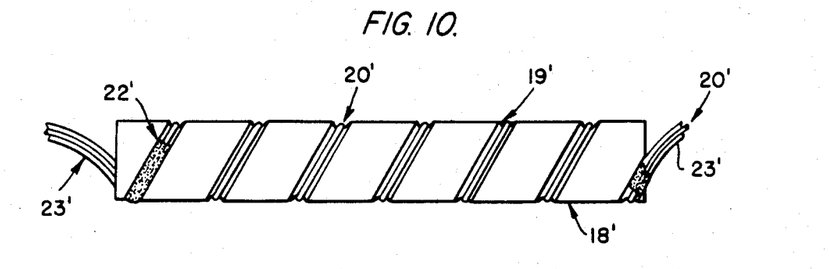
FIG. 10 is an illustration of a form and a single mode optical fiber as arranged by the invention for the purpose of manufacturing fiber optic energy sensors.
Figure 11:
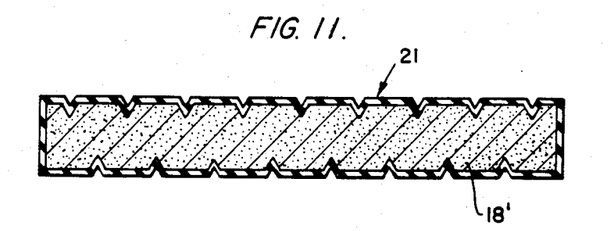
FIG. 11 is a cross section of only the form of FIG. 10 after having been coated with a guard material in accordance with the invention.

The invention also provides the following method of manufacture of fiber optic energy sensors which may employ etched single mode fiber. First, a form is made which will maintain the fiber to be etched in the same configuration or arrangement as it is to be used in the particular sensor being constructed. In the case of the hydrophone of FIGS. 5, 6 and 7, the fiber is configured as a helix. A suitable form for this hydrophone is a cylinder 18 as shown in FIG. 10, around which is cut a spiral groove 19' in which is wound an unetched optical fiber 20'. If it is desired that the form be removed after etching, the form material should be a material which can be melted or dissolved into the liquid state at temperatures or with solvents which will not cause damage to the fiber or the compliant membrane material. Such a form material is beeswax. Further, because some form materials may jeopardize even etching of the fiber (wax may rub onto the fiber in places, thus shielding it from the etchant), forms of such materials are first lightly coated by dipping or spraying with solution of a guard material 21' in FIG. 11, which upon hardening will not affect the etching process. Suitable guard materials are: Type 139 Low Andex Plastic Cladding Solution produced by Optelecom, or Kynar, a vinylidene fluoride manufactured by Pennwalt Chemical Co. In cases where the fiber to be etched will not have a sufficient glass clad to guide light, the invention provides that the guard material have a lower optical index of refraction than that of the fiber core. Type 139 Low Andex Plastic Cladding Solution or Kynar have optical indices lower than that of silica glass.

When necessary, the invention also provides that the fiber be cemented to the form at perhaps the ends of the etching core as shown at 22' in FIG. 10. The guard materials already mentioned will suffice as cement.

When it is necessary to protect portions of the fiber from the etchant, these portions may also be coated with the guard materials already mentioned as shown at 23' in FIG. 10.

If the fiber optic energy sensor is to employ etched singled mode fiber, the invention next causes the form 18' with fiber 20' in place as shown in FIG. 10 to be placed in a bath of either hydrofluoric acid or hydrofluoric acid buffered with ammonium bifluoride, or any other chemical which can dissolve or remove the glass clad of the fiber. In general, this etching bath is ultrasonically agitated, if necessary, to facilitate entry of the etchant around all portions of the fiber which must be etched.

After the etching period, (which may be determined empirically), has concluded the form with the now etched fiber in place is removed from the bath, washed in water, dried and then dipped in and removed from a bath of dissolved or molten coating material, or sprayed or otherwise coated with a solution of the material which when cured, dried, or cooled becomes the compliant membrane material. Ultrasonic agitation of the bath is carried out when necessary to facilitate entry of the coating liquid around all portions of the fiber. The invention also provides that the application of the coating material may take place in a vacuum to aid uniformity of coating and elimination of air pockets.

Figure 12:
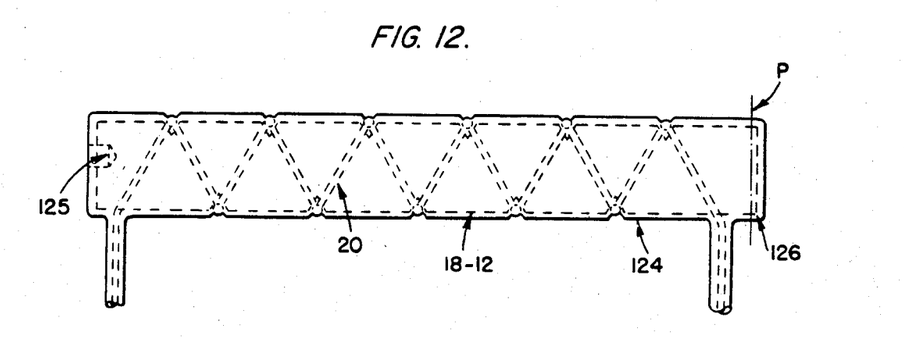
FIG. 12 is an illustration of the form and single mode optical fiber of FIG. 10 after etching and coating in accordance with the invention.

In cases using a fiber which after etching does not have sufficient cladding thickness to cause electro-magnetic radiation to be guided in the core, the invention provides that the coating material have an index of refraction which is lower than the core material. Such coating baths may be either of the guard materials already mentioned or silicone rubber such as General Electric Company's RTV 670. The viscosity of the coating bath may be varied as a means of controlling the thickness of the coating which remains on the form upon its removal from the bath. Lower coating bath viscosities will provide thinner coatings. The form having been removed from the coating bath is then rotated until the coating has hardened in order to achieve an even coat in the presence of gravity. FIG. 12 depicts the form and fiber of FIG. 10 after the etching and dipping processes have been completed. The etched fiber is denoted as 20-E and the compliant membrane material is denoted as 124.

After the coating in FIG. 12 has solidified, holes are drilled through the coating and guard materials which extend into the form material. The location of such holes must be chosen so as to allow the form material to be removed by melting or dissolving but without damage to the fiber within the coating. Such a hole 125 is shown in FIG. 12. The form may be of a material such as teflon which may be cooled with liquid nitrogen to cause the form to shrink away from the compliant membrane and guard material, thus facilitating its removal through a much larger opening 126 in FIG. 12 formed by cutting away the membrane at the plane marked P in FIG. 12. Further, it is contemplated the form may be collapsed to facilitate its removal. For the hydrophone of FIGS. 5, 6 and 7, a suitable form which could be collapsed is shown in end view, FIG. 13.

Figure 13:
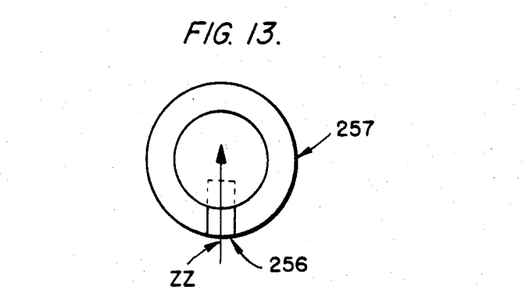
FIG. 13 is an end view of a collapsible form which could be used in the etching process.

FIG. 13 is an end view of a cylinder 257. A removable section of this cylinder called a key is shown at 256. The key 256 extends parallel to the axis of the cylinder and for the entire length of the cylinder. The arrow labeled ZZ illustrates the motion of the key to facilitate its removal. Upon the key's removal, the cylinder 257 will collapse radially thus allowing its removal from the compliant membrane material after etching and dipping.

If it is desired to produce a fiber optic energy sensor which uses a compliant sleeve or envelope to contain unetched optical fibers, then the invention also allows the etching and washing steps to be eliminated from the above-detailed manufacturing process.

Optical Demodulation System

Figure 14:
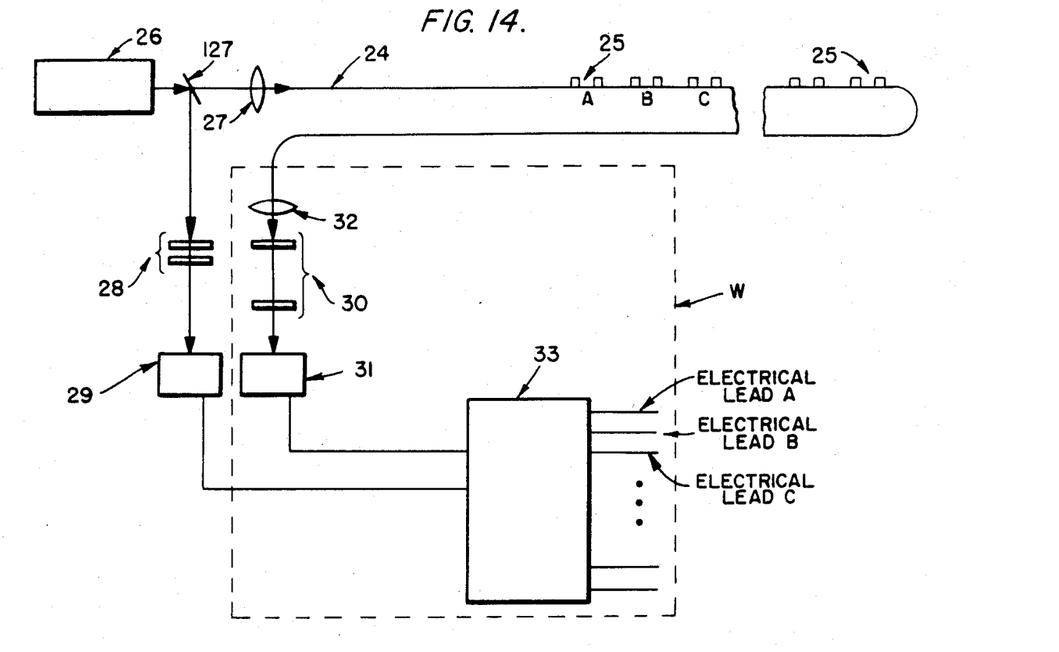
FIG. 14 is a schematic diagram of an optical demodulation system provided by the invention.

The optical demodulation system included in the invention is shown in FIG. 14. Referring to FIG. 14, 24 designates an optical fiber upon which are mounted pairs 25 of length limited distributed Bragg reflectors. Length limited distributed Bragg reflectors are, as used in the invention, devices which cause particular wavelength bands of electro-magnetic radiation traveling in the optical fiber to be in part reflected back to the source and in part transmitted onward through the optical fiber and allow light which is spectrally outside of these particular wavelength bands to be transmitted onward through the optical fiber nearly unaffected. Such reflectors may be constructed by inducing spatially periodic perturbations of the optical index of the clad surrounding the core of an optical fiber so that the spatial period exists in a direction parallel to the axis of the core and the required length of the spacial period does not exceed the length over which optical coherence is maintained for the optical fiber. Spatially periodic perturbations can be induced by partially removing the clad from a length of the fiber and then placing the fiber against an optical grating so that the teeth of the grating are perpendicular to the axis of the core. The magnitude of the reflectivity may be increased or decreased by removing more or less of the clad thus placing the optical grating nearer or further from the core as disclosed in our co-pending Application Ser. No. 088,579 filed Oct. 26, 1979. Such reflectors may also be constructed using the method developed by Hill et al and described in "Photosensitivity in Optical Fiber Waveguides: Application to Reflection Filter Fabrication", *Applied Physics Letters;* #32(10), May 15, 1978, where it is shown that a reflection wavelength band occurs at:

$$\lambda_{cm} \approx 2nd\ M \qquad \text{EQ III}$$

where $\lambda_{cM}$ is the center of the reflection wavelength band for a particular value of M;

n is the effective optic index of refraction for the optical fiber core;

d is the spatial period of the perturbations which create the Bragg reflector;

and

M is an integer which is greater than zero and will be called the order of the reflection band.

The width, $\Delta\lambda_{cM}$, is the full spectral width of a particular reflection band measured at half of the total reflected intensity of which the particular Bragg reflector is capable. It is shown in the prior art to be:

$$\Delta\lambda_{cM} \approx \frac{(\lambda_{cm})^2}{2nl} \qquad \text{EQ IV}$$

where l is the length of the length limited Bragg reflector.

Referring again to FIG. 14, the pairs 25 of reflectors are labeled A, B, C, .... Both reflectors in each pair are made to partially reflect the same wavelength bands and to have the same transmission spectra by for instance, adjusting d and l. However, each pair is made so that it reflects particular wavelength bands which are spectrally different than the reflection wavelength bands of all other pairs, again by adjusting d and l in accordance with EQ III and EQ IV, so that there is a wavelength interval W.I. which contains at least one of only these particular wavelength bands for each reflector pair to be used.

Figure 15:
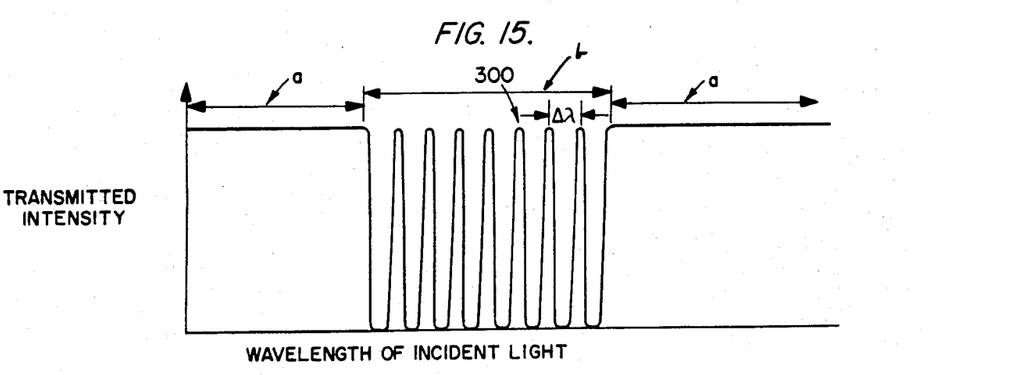
FIG. 15 is an illustration of a typical transmission of a reflector pair of the pairs 25 in FIG. 14.

Each pair 25 forms a Fabry-Perot type interferometer inside of the single mode fiber 24. This Fabry-Perot type interferometer is sensitive only to electro-magnetic radiation which is spectrally within the reflection wavelength bands of the distributed Bragg reflectors which form the particular pair. FIG. 15 is an illustration of the transmission of a particular reflector pair. Referring to FIG. 15, the ordinate represents the transmission of electro-magnetic radiation through the particular reflector pair and the absicca represents the wavelength of electro-magnetic radiation which is traveling inside the fiber 24 and is incident on the reflector pair. Electromagnetic radiation which is spectrally outside of the reflection wavelength bands of a particular pair is transmitted practically unaffected. Such radiation is shown as regions a in FIG. 15.

The maximum amount of electro-magnetic radiation traveling inside the fiber and spectrally within the reflector bands of a particular reflector pair will be transmitted onward through the reflector pair when the wavelength $$\lambda = \frac{2(OPL)}{N - \frac{1}{2}} \qquad \text{EQ V}$$

where
OPL is the optical path length between the reflectors; and
N is a positive integer.

$$\text{If } \lambda = \frac{2(OPL)}{N} \qquad \text{EQ VI}$$

then a minimum amount of the electro-magnetic radiation will be transmitted onward through the reflector pair.

This results in a spectrally periodic transmission as is shown in region b of FIG. 15.

As is taught in the field of inerferometry, the spectral width of the transmission peaks which are designated 300 in FIG. 15 may be altered with respect to the spectral separation of the transmission peaks $\Delta\lambda$ by changing the magnitude of the reflectivity of the length limited Bragg reflectors which form the pair of reflectors responsible for the transmission peaks. This can be achieved as previously discussed.

The number of peaks 300 in wavelength region b of FIG. 15 is given by:

$$X \approx \frac{Z}{l} \qquad \text{EQ VII}$$

where
Z is the geometric length between the reflectors as measured along the axis of the single mode fiber; and
l is the length of the distributed Bragg reflectors as measured along the fiber axis.

As the optical path length between the two reflectors of a pair changes, the transmission peaks shown in FIG. 15 within wavelength region b will shift spectrally within this region b, as is indicated by EQ V.

The invention causes some or all of the length of the optical fiber 24, located between the two reflectors of a pair, to be the interaction length of a fiber optic energy sensor, e.g., the acoustic energy sensor of FIGS. 5, 6 and 7. As previously explained, such sensors operate by allowing signal energy being detected to longitudinally stretch or compress a length of optical fiber thus changing its optical path length. Therefore, for a reflector pair B, for example, inside of which is located an interaction length of a fiber optic energy sensor which is detecting a signal the transmission peaks of region b of FIG. 15 of this pair B will shift spectrally as caused by the signal energy being detected.

Figure 16:
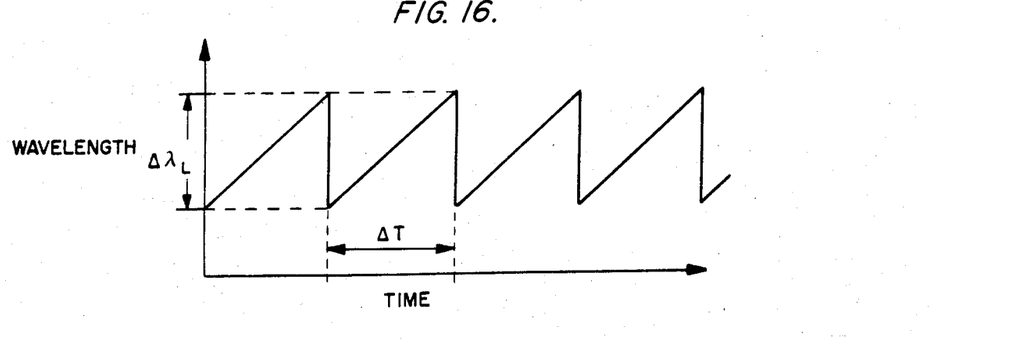
FIG. 16 is a graph of a laser output suitable for use in the optical demodulation system of FIG. 14.

Referring again to FIG. 14, the invention uses a wavelength scanning laser 26 to supply electro-magnetic radiation which is injected with suitable focusing lenses 27 into the single mode fiber 24 upon which are located the reflector pairs 25. The output of the laser 26 is scanned or chirped over a particular wavelength range. FIG. 16 contains a graph of a laser output suitable for the invention. The scan range is $\Delta\lambda_L$, and is so labeled in FIG. 16. The scan time interval is $\Delta T$ and is also labeled as such in FIG. 16. The scan rate is $$\frac{\Delta\lambda_L}{\Delta T}.$$

The invention chooses the scan range of the laser 26 to be the wavelength interval W.I. previously mentioned so that a reflector wavelength band region b of FIG. 15 of each pair 25 in FIG. 14 lies spectrally within the scan range.

Once again referring to FIG. 14, the assembly includes a beam splitter 127 to direct a portion of the laser output beam to a Fabry-Perot interferometer 28 hereafter called "reference Fabry-Perot" interferometer. When the output wavelength $\lambda_L$ of the laser is such that $$\lambda_L \frac{(Q - \frac{1}{2})}{2} \approx D \qquad \text{EQ VIII}$$

where
Q is a positive integer
and
D is the optical path length between the reflectors forming the Fabry-Perot interferometer 28, then the reference Fabry-Perot interferometer 28 will transmit some of this radiation to the photodetector 29 of FIG. 14, which will then produce an electrical reference signal. Photodetector 29 is a commercial device, e.g. #TIXL 452 produced by Texas Instruments Inc., the output of which is an electrical signal the amplitude of which is a known function of the amplitude of the incident radiation. If the laser is scanning as in FIG. 16, the transmitted output of the reference Fabry-Perot interferometer 28 will be a series of temporally separated peaks each one corresponding to a resonance of the reference Fabry-Perot interferometer 28.

The invention arranges the optical path length D of the reference Fabry-Perot interferometer 28 and chooses the spatial periods of the reflectors in each reflector pair 25 so that for the laser scan range $\Delta\lambda_L$ a transmission peak of the reference Fabry-Perot interferometer 28 occurs at a wavelength very near the reflector wavelength band of each reflector pair 25.

Again referring to FIG. 14, the output end of the single mode fiber 24, i.e., the opposite end from that into which the laser beam in injected, is associated with a suitable focusing mechanism 32 focused into a Fabry-Perot interferometer 130 as shown in FIG. 14. The output of the interferometer 30 is directed onto a photodetector 31.

The prior art of interferometry and the preceding explanation of the spectral transmission of a reflector pair 25 shows that if the scanning laser is at some particular time injecting a particular wavelength $\lambda_L$ of electro-magnetic radiation into the fiber which falls within the wavelength region b, shown in FIG. 15, of a particular reflector pair A, then this electro-magnetic radiation will be transmitted through the particular reflector pair A, through the remaining fiber, through all other reflector pairs (since the invention causes all other reflection wavelength bands of all other reflector pairs, B, C, etc. to be different), through the Fabry-Perot interferometer 30 and onto the photodetector 31 at maximum intensity whenever the injected radiation wavelength $\lambda_L$ is spectrally centered on a particular transmission peak of FIG. 15 of the particular reflector pair A and when this particular transmission peak is also spectrally coincident with a transmission peak of the Fabry-Perot interferometer 30, hereafter called the analyzer Fabry-Perot interferometer.

The optical path length $T_R \approx (n)(Z)$ between the reflectors of, e.g., reflector pair B is arranged so that for a particular wavelength region between $\lambda_{1D}$ and $\lambda_{2D}$ the reflector pair B will produce $S_R$ transmission peaks. This will occur if:

$$T_R \approx \left| \frac{S_R}{\left( \frac{1}{\lambda_{1D}} - \frac{1}{\lambda_{2D}} \right)} \right| \qquad \text{EQ IX}$$

For the same wavelength region between $\lambda_{1D}$ and $\lambda_{2D}$, the analyzer Fabry-Perot interferometer 30 will produce $S_A$ transmission peaks if:

$$T_A \approx \left| \frac{S_A}{\left( \frac{1}{\lambda_{1D}} - \frac{1}{\lambda_{2D}} \right)} \right| \qquad \text{EQ X}$$

where $T_A$ is the optical path length between the reflectors of the analyzer Fabry-Perot interferometer 30.

As previously explained, if a signal is detected by a fiber optic energy sensor which is located between the length limited Bragg reflectors of, for example, pair B, then the transmission peaks of region b of FIG. 15 of pair B will undergo a spectral shift, $\Delta\lambda_{SR}$, within the region b. By adjusting the relative values of $S_A$ and $S_R$ using EQ IX and X the invention actually amplifies this spectral shift, $\Delta\lambda_{SR}$ by causing the resulting spectral shift, $\Delta\lambda_{SA}$ of the transmission, of pair B and the analyzer interferometer 30 combined as in FIG. 14 to be:

$$\Delta\lambda_{SA} \approx U\Delta\lambda_{SR} \qquad \text{EQ XI}$$

where U is the amplification and is, for example:

$$U \approx \frac{\sqrt{S_R}}{\sqrt{S_R} - S_A} \qquad \text{EQ XII}$$

for $S_A = (f)(S_R) \pm 1$
and $S_A$ and $S_R > 2$ and f is a positive integer

To better explain the demodulation system and to demonstrate some of the less evident constraints to be considered for its implementation, an example of the system of FIG. 14 with the addition of energy sensors placed within the pairs 25 as previously detailed will be detailed chronologically through two laser scan intervals. The laser scan begins at $\lambda_1$ which does not fall within the reflection wavelength bands of any of the pairs 25. As the laser output wavelength scans in time, it will eventually begin to scan across the transmission peaks of a particular pair A. At this time the reference interferometer 28 transmits a pulse of laser light to the photodetector 29 which then delivers an electrical pulse to the time demodulator 33. This electrical reference pulse is used in the time demodulator 33 to reset and start an electrical clock. The time demodulator 33 also counts the reference pulses in one scan interval and depending on the number of the pulse, directs the final output of the electrical clock to one of the electric outputs corresponding to the particular reflector pair whose transmission peaks are being scanned at that time. Such electronic circuitry can be readily acquired from present commercially available products.

Returning to the example of the system, the laser output is now beginning to scan over the transmission peaks of pair A. When the laser output wavelength is within the first peak of pair A, at $\lambda_2$, the laser light travels through pair A and all other pairs and eventually to the analyzer interferometer 30. For the sake of the explanation, assume that the system of FIG. 14 is designed to provide an amplification $U = 100$ by making use of EQ XII with $S_R = 10$. Also for simplicity, assume that the interval between $\lambda_{1D}$ and $\lambda_{2D}$ of EQ X and XI for each reflector pair in the example system is spectrally coincident with region b of FIG. 15 for each reflector pair. Therefore, for $U = 100$, $S_R = 10$, then $S_A = 99$.

Assume also that the analyzer interferometer 30 has a peak which is spectrally coincident with the first peak of pair A. Therefore, the laser light is transmitted onto the photodetector 31 which produces an electrical output which when delivered to the time demodulator 33 stops the electric clock the final output of which is an electric signal corresponding to the time on the clock and is delivered to the electrical lead or leads labeled A. As the laser continues to scan eventually the wavelength of its output nears the transmission peaks of pair B. Again the reference interferometer 28 transmits a pulse of light which causes photodetector 29 to produce a pulse which resets and starts the clock and prepares electrical lead or leads B for the final output of the clock.

As the signal being detected by the energy sensor of pair A changes, the transmission peaks of pair A shift spectrally. Assume that the signal has caused the peaks to shift $$\frac{1}{99} (\Delta\lambda)$$

sometime prior to the second laser scan. When the second laser scan begins, the output wavelength is again $\lambda_1$. Soon after the beginning of the scan, the laser output again nears the first transmission peak of pair A, the output wavelength is approximately $$\lambda_2 + \frac{1}{99} \Delta\lambda.$$

This wavelength, however, is not coincident with a peak of the analyzer interferometer 30 so no light is transmitted to the photodetector 31 to stop the clock.

However, as the laser continues to scan its output will at a later time be $$\lambda_2 + \frac{1}{99} \Delta\lambda + \Delta\lambda,$$

which is the new spectral location of the second transmission peak of pair A. By the previous equations for the amplification U of this example system, $$\lambda_2 + \frac{1}{99} \Delta\lambda + \Delta\lambda$$

is also the spectral location of the analyzer interferometer 30 transmission peak which is spectrally next to that peak located at $\lambda_2$. Therefore, transmission occurs through analyzer interferometer 30 and the photodetector 31 produces a signal which stops the clock. Even though the transmission peaks of pair A shifted only $$\frac{1}{99} (\Delta\lambda),$$

the output of the combination of pair A and the interferometer 30 did not occur until the laser output wavelength reached $$\lambda_2 + \frac{1}{99} \Delta\lambda + \Delta\lambda$$

resulting in a spectral amplification of 100. The remainder of the second scan interval proceeds as described in the first laser scan interval.

The implementation of the demodulation system requires particular attention to the bandwidth of the optical fiber 24. The bandwidth must be sufficiently high so as to maintain the narrowness of the returning reflector pair transmission peaks. Single mode fiber will suffice in most cases. Note that the optical demodulation system can be used whenever it is desired to determine the spectral motion of the fringes of a Fabry-Perot interferometer with or without the use of optical fiber. It is also allowed that the laser light may pass through the analyzer Fabry-Perot interferometer first and then to the Fabry-Perot interferometer whose spacing one is attempting to measure. However, if optical fiber is used to carry the laser light to the Fabry-Perot interferometer being measured, and if the laser light is to pass through the analyzer interferometer first, then it is necessary to select optical fiber with low dispersion for carrying light from the analyzer interferometer to the Fabry-Perot interferometer since this light will have an additional amplitude temporal dependence as caused by the spectrally periodic transmission of the analyzer interferometer. Further, the finesse of both the analyzer interferometer and the sensor interferometer must be chosen so that if none of the transmission peaks is exactly coincident spectrally there will still be only sufficient overlap to produce a meaningful combined output. Finally, the example system will produce ambiguous outputs if the spectral motion of the reflector pair transmission peaks is allowed to equal or exceed $0.1\Delta\lambda$ or is below $$\frac{1}{99} \Delta\lambda.$$

Finally, the invention provides that the electrical reference signal may be derived from the same signal which causes the laser to scan. The criteria for a reference signal is only that it must have a known position in time with respect to that position in time of any particular wavelength of the laser scan. Further, the criteria for a suitable laser scan is: first, the scan interval must occur sufficiently often in a period of time in order to detect the highest frequency of the oscillation of the temporal position of the output of the combination of a reflector pair and analyzer interferometer; second, the output wavelength of the scanning laser must be a known function of time.

Figure 17:
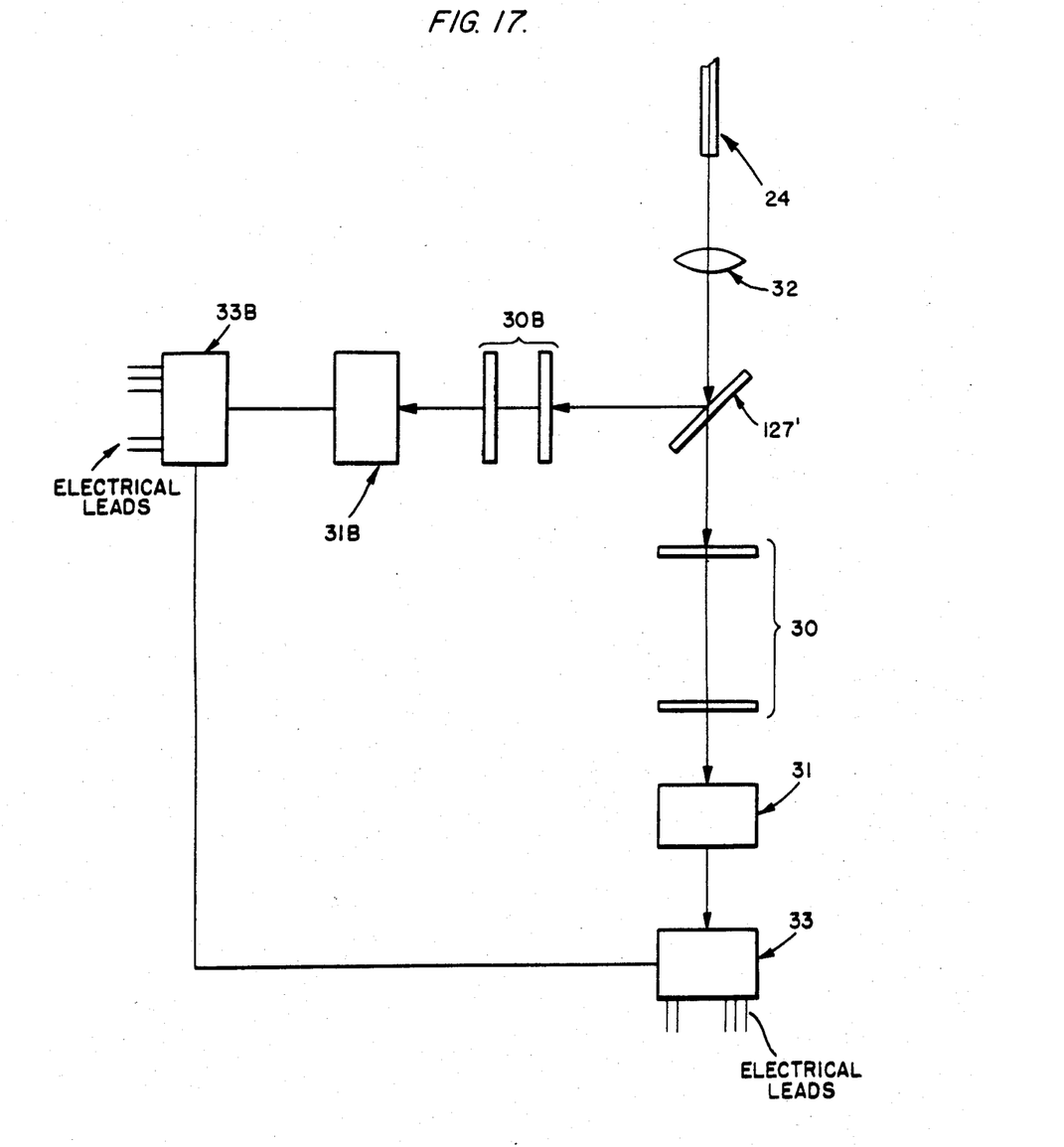
FIG. 17 is a schematic diagram of a multiple analyzer interferometer demodulator which the invention provides as a substitute for the part of the optical demodulation system which is enclosed by dashed lines W in FIG. 14.

To eliminate the said ambiguity for the excessive motion of the peaks the invention provides the addition of a second analyzer interferometer 30B shown in FIG. 17. FIG. 17 is a schematic of a replacement subsystem for that subsystem W enclosed by the dashed lines in FIG. 14. This additional analyzer 30B is arranged by means of, e.g., EQ XII, to provide a lower magnification when used with the same output of the reflector pairs. From the previous explanation a lower amplification combination can provide a higher threshold for transmission peak motion at which ambiguity first occurs. If EQ XII is used to establish the amplification U then the threshold spectral shift is:

$$\frac{f\Delta\lambda}{U} \quad \text{EQ XIII}$$

Such an arrangement using two analyzer interferometers each causing different amplifications could be implemented as follows: the first interferometer 30 could have as in the previous example of the demodulation system $S_A = 99$ transmission peaks between $\lambda_{1D}$ and $\lambda_{2D}$. The reflector pair could have $S_R = 10$ peaks between $\lambda_{1D}$ and $\lambda_{2D}$ and the additional interferometer 30B could have $S_A = 9$ peaks between $\lambda_{1D}$ and $\lambda_{2D}$. If, for example, time demodulators 33 and 33B provided analog outputs then for a particular shift $\Delta\lambda_{SR}$ corresponding to pair A the electrical output of time demodulator 33B corresponding to pair A would be a voltage e such that:

$$e_1 = K\Delta\lambda_{SR} U_1 \quad \text{EQ XIV}$$

where
 K is a constant
 $U_1$ is the amplification which equals 10 for $S_R = 10$ and $S_A = 9$
and
 $\Delta\lambda_{SR}$ is the spectral shift of the peaks of region b of FIG. 15 corresponding to electrical lead A
The outout $e_2$ of demodulator 33 would be:

$$e_2 = K\Delta\lambda_{SR} U_2 \quad \text{EQ XV}$$
$$= 100 K\Delta\lambda_{SR}$$

where
 100 is the amplification, $U_2$, for $S_R = 10$ and $S_A = 99$

Such an arrangement of course can be expanded to include many such analyzer interferometers with different amplifications simply by adding more beamsplitters such as 127' to divide the output of the reflector pairs among them. Note that from the previous explanation analyzer interferometer 30B may begin to produce ambiguity for spectral shifts smaller than $0.1\Delta\lambda$. However, analyzer 30 will as described produce meaningful outputs for spectral shifts below $0.1\Delta\lambda$. One may therefore contemplate adding analyzer interferometers which would cause either lower or higher amplification than those analyzer interferometers already present in a system.

Figure 18:
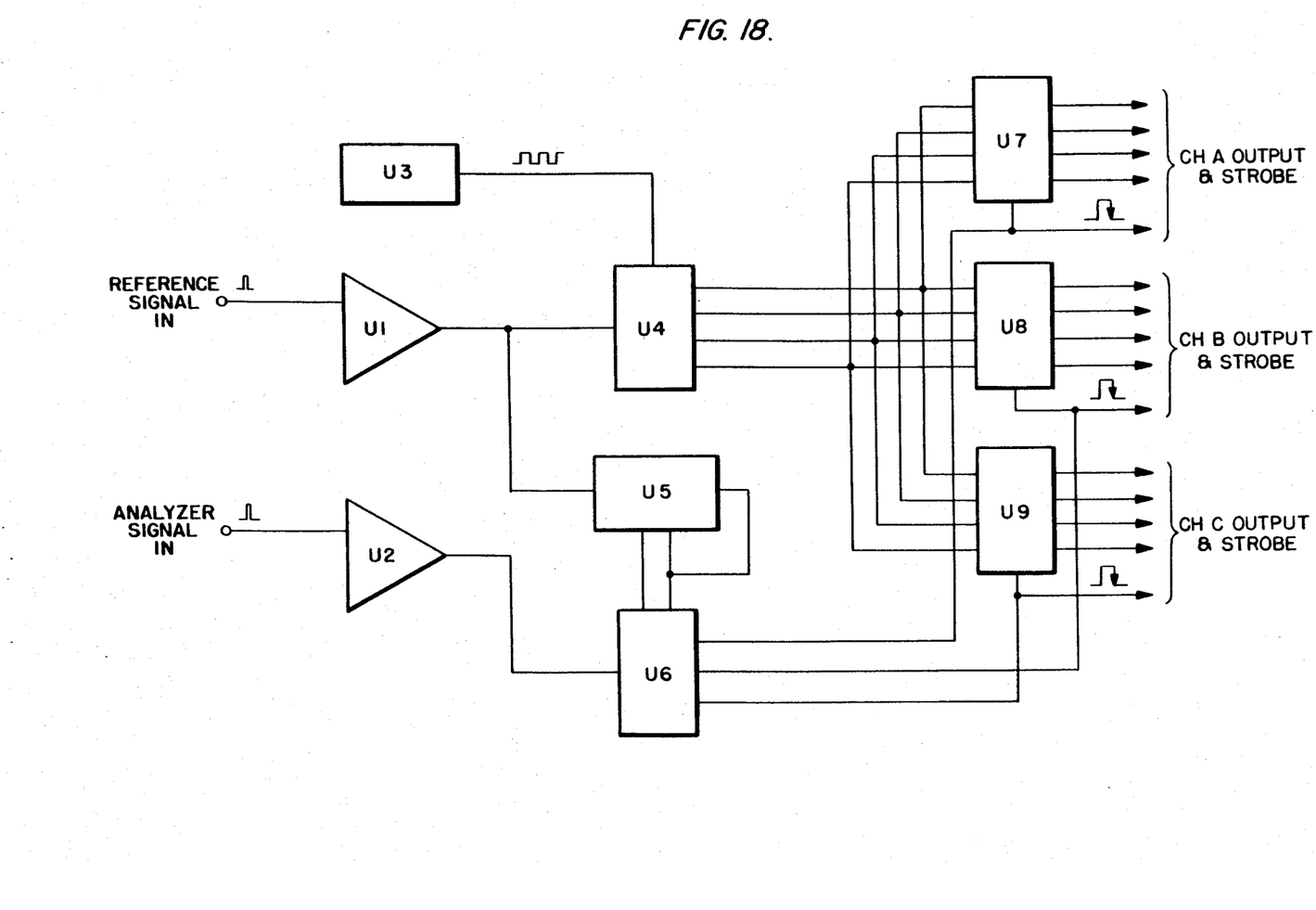
FIG. 18 is a schematic diagram of an example time demodulator circuit illustrated in FIGS. 14 and 17.

The time demodulator is an electrical device which performs two functions: first, producing an electrical signal which by means of, for example, its amplitude, frequency of oscillation or phase of oscillation contains or conveys the time between the receipt of a reference pulse and the receipt of an additional pulse called ANAL pulse, which is the pulse from the photodetector receiving electro-magnetic radiation from the analyzer Fabry-Perot interferometer, and; second, directing this electric signal to a particular output wire or to a particular group of output wires. There are many electrical circuits which can accomplish this one of which is shown achematically in FIG. 18. Referring to FIG. 18, U1 and U2 are voltage comparators, for example, part #LM311 produced by National Semiconductor Corp., U4 and U5 are counters, e.g. part #74161 produced by Texas Instruments, U3 is a clock generator, e.g., part #74LS124 produced by Texas Instruments, U6 is a demux, e.g., part #74155 produced by Texas Instruments and U7, U8, and U9 are latches, e.g., part #74175, also produced by Texas Intruments.

The circuit operates as follows: U1 and U2, voltage comparators, serve to convert the reference pulse and the additional pulse into standard TTL logic voltage levels for use in the demodulator. The regularly spaced reference pulses serve to reset counter U4 which is continually counting at a rate approximately 16 times as fast as the reference pulse repetition rate, as driven by clock generator U3. The resulting output of counter U4 is a number which starts at 0 when the reference pulse is received and counts upward until again reset to 0 by another reference pulse, starting its count anew. Meanwhile, each time a reference pulse is received, counter U5 is incremented. It is set to automatically return to 0 after counting the appropriate number of channels (in this case, 3). When an ANAL pulse comes, it is routed to the appropriate latch (U7, U8, or U9) via demux U6. The counter output number is latched into the appropriate channel latch and represents the time between the reference and ANAL pulses. The next ANAL pulses causes the next channel latch to store the number representing the time between those reference and ANAL pulses, and so on. Each time a new time count is latched, the trailing edge of the latch pulse notifies the user that new data is available.

Statement of Industrial Application

An improved fiber optic energy sensor and method of manufacturing the sensor, and an improved optical demodulation system is provided which is particularly sensitive to stretching or compressing by signal energy to be sensed or detected.

We claim:

1. Means for phase modulating electro-magnetic radiation traveling in the core of an optical fiber comprising:
    an etched optical fiber; and
    means for longitudinally stretching or compressing the etched optical fiber, wherein the etched optical fiber is coated with a material having an optical index lower than that of the etched optical fiber's core and having a modulus of elasticity lower than that of the material which was removed by etching.

2. Means for guiding electro-magnetic radiation comprising an etched optical fiber having low modal dispersion, wherein the optical fiber having low modal dispersion is coated with a material having an optical index lower than that of the core of the fiber.

3. A method of phase modulating electro-magnetic radiation comprising:
    directing the electro-magnetic radiation into an etched optical fiber and longitudinally stretching or compressing the etched optical fiber, said method further comprising coating the fiber with a material having an optical index of refraction lower than that of the etched optical fiber's core and having a modulus of elasticity lower than that of the material which was removed by the etching process.

4. The method of guiding electro-magnetic radiation to provide low modal dispersion comprising injecting the radiation into an optical fiber produced by etching a fiber of optical fiber core material, wherein the optical fiber produced by etching a fiber of optical fiber core material is coated with a material having an optical index lower than that of its core.

* * * * *